(12) United States Patent
Cedoz (10) Patent No.: US 9,878,798 B2
(45) Date of Patent: Jan. 30, 2018

(54) AIRCRAFT WITH COUNTER-ROTATING TURBOFAN ENGINES

(71) Applicant: Rolls-Royce North American Technologies, Inc., Indianapolis, IN (US)

(72) Inventor: Robert W. Cedoz, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 230 days.

(21) Appl. No.: 14/964,114

(22) Filed: Dec. 9, 2015

(65) Prior Publication Data

US 2016/0185460 A1    Jun. 30, 2016

Related U.S. Application Data

(60) Provisional application No. 62/098,637, filed on Dec. 31, 2014.

(51) Int. Cl.
*B64D 35/06* (2006.01)
*B64D 35/02* (2006.01)
(Continued)

(52) U.S. Cl.
CPC ............. *B64D 35/02* (2013.01); *B64D 27/18* (2013.01); *B64D 35/06* (2013.01); *F01D 1/26* (2013.01); *F01D 7/00* (2013.01); *F01D 15/12* (2013.01); *F02C 3/107* (2013.01); *F02K 3/072* (2013.01); *F05D 2220/323* (2013.01);
(Continued)

(58) Field of Classification Search
CPC ........ B64D 35/06; B64D 35/04; B64D 35/02; B64D 35/00
See application file for complete search history.

(56) References Cited

U.S. PATENT DOCUMENTS 2,479,406 A    8/1949  Rapuano
3,106,369 A *  10/1963  Borst ..................... B64C 9/38
                                                              244/52

(Continued)

FOREIGN PATENT DOCUMENTS

DE    102008024463 A1   12/2009
EP         1918199 A2    5/2008
WO      2013116259 A1    8/2013

OTHER PUBLICATIONS

Extended European Search Report, European Application No. 15200581.5-1607, dated May 24, 2016, 8 pages.

*Primary Examiner* — Brian M O'Hara
(74) *Attorney, Agent, or Firm* — Barnes & Thornburg LLP (57) ABSTRACT

An aircraft including a frame, a first turbofan engine coupled to the frame, and a second turbofan engine coupled to the frame is disclosed. The first turbofan engine includes a first turbine, a first fan coupled to the first turbine to be driven by rotation of the first turbine, and a first transmission coupled between the first turbine and the first fan to transmit rotation from the first turbine to the first fan. The second turbofan engine includes a second turbine, a second fan coupled to the second turbine to be driven by rotation of the second turbine, and a second transmission coupled between the second turbine and the second fan to transmit rotation from the second turbine to the second fan.

14 Claims, 4 Drawing Sheets

(51) Int. Cl.
  *F01D 7/00*    (2006.01)
  *F01D 1/26*    (2006.01)
  *F01D 15/12*   (2006.01)
  *F02K 3/072*   (2006.01)
  *F02C 3/107*   (2006.01)
  *B64D 27/18*   (2006.01)

(52) U.S. Cl.
  CPC .................. *F05D 2240/24* (2013.01); *F05D 2260/40311* (2013.01); *F05D 2260/70* (2013.01)

(56) References Cited

U.S. PATENT DOCUMENTS

| | | |
|---|---|---|
| 4,767,270 A | 8/1988 | Seidel |
| 5,010,729 A | 4/1991 | Adamson et al. |
| 5,282,358 A | 2/1994 | Schilling |
| 7,493,753 B2 | 2/2009 | Ory et al. |
| 7,530,217 B2 | 5/2009 | Murrow et al. |
| 7,575,192 B1 | 8/2009 | Kish |
| 7,624,565 B2 | 12/2009 | Murrow et al. |
| 8,517,672 B2 | 8/2013 | McCooey |
| 9,475,585 B2 * | 10/2016 | Hong .................... B64D 35/00 |
| 2007/0018035 A1 | 1/2007 | Saiz et al. |
| 2013/0000341 A1 | 1/2013 | McCaffrey |
| 2013/0195603 A1 | 8/2013 | Sheridan et al. |

* cited by examiner

AIRCRAFT WITH COUNTER-ROTATING TURBOFAN ENGINES

CROSS REFERENCE TO RELATED APPLICATIONS

This application claims priority to and the benefit of U.S. Provisional Patent Application No. 62/098,637, filed 31 Dec. 2014, the disclosure of which is now expressly incorporated herein by reference.

FIELD OF THE DISCLOSURE

The present disclosure relates generally to gas turbine engines, and more specifically to turbofan engines.

BACKGROUND

Modern aircraft are often propelled by sets of turbofan engines that provide thrust for the aircraft. Such turbofan engines are typically arranged on opposing sides of a fuselage under (or sometimes over) wings that extend from the fuselage. The turbofan engines are mounted to a structural frame of the aircraft so that thrust provided by the turbofan engines moves the entire aircraft.

Each turbofan engine includes a fan that rotates to push air and propel the aircraft. The rotation of each fan creates a torque that is applied to the frame of the aircraft during operation of the turbofan engines. Generally, the fans of the turbofan engines rotate in the same direction which induces torque in the same direction and requires the frame of the aircraft to react the torque of each fan.

SUMMARY

The present disclosure may comprise one or more of the following features and combinations thereof.

An aircraft may include a frame, a first turbofan engine coupled to the frame, and a second turbofan engine coupled to the frame. The first turbofan engine may include a first turbine, a first fan coupled to the first turbine to be driven by rotation of the first turbine, and a first transmission coupled between the first turbine and the first fan to transmit rotation from the first turbine to the first fan. The second turbofan engine may include a second turbine, a second fan coupled to the second turbine to be driven by rotation of the second turbine, and a second transmission coupled between the second turbine and the second fan to transmit rotation from the second turbine to the second fan. The first turbine and the second turbine may be configured to rotate in a first direction. The first transmission may be configured to transmit rotation from the first turbine to the first fan to cause rotation of the first fan in the first direction. The second transmission may be configured to transmit rotation from the second turbine to the second fan to cause rotation of the second fan in a second direction opposite the first direction.

In some embodiments, the first transmission may include a star gearset, and the second transmission may include a planetary gearset. The star gearset may include a sun gear coupled to the first turbine for rotation therewith, a plurality of planet gears intermeshed with the sun gear and mounted to a carrier grounded to a case, and a ring gear intermeshed with the plurality of planet gears and coupled to the first fan for rotation therewith. Additionally, in some embodiments, the planetary gearset may include a sun gear coupled to the second turbine for rotation therewith, a plurality of planet gears intermeshed with the sun gear and mounted to a carrier coupled to the second fan for rotation therewith, and a ring gear intermeshed with the plurality of planet gears and grounded to a case. The first transmission may be configured to provide a first speed ratio between the first turbine and the first fan, the second transmission may be configured to provide a second speed ratio between the second turbine and the second fan, and the magnitude of the first speed ratio may be equal to the magnitude of the second speed ratio.

In some embodiments, the first fan may include a fan disk and a plurality of fan blades coupled to the fan disk to establish a first pitch angle, the second fan may include a fan disk and a plurality of fan blades coupled to the fan disk to establish a second pitch angle, and the second pitch angle may be about equal to and opposite the first pitch angle. The fan blades of the first fan may be movable relative to the fan disk of the first fan to change the first pitch angle, and the fan blades of the second fan may be movable relative to the fan disk of the second fan to change the second pitch angle. Additionally, in some embodiments, the fan blades of the first fan may be immovably coupled to the fan disk of the first fan and the fan blades of the second fan may be immovably coupled to the fan disk of the second fan.

In some embodiments, the aircraft may further include a fuselage arranged between the first turbofan engine and the second turbofan engine.

According to another aspect of the present disclosure, an engine set for an aircraft may include a first turbofan engine and a second turbofan engine. The first turbofan engine may include a first turbine, a first fan coupled to the first turbine to be driven by rotation of the first turbine, and a first transmission coupled between the first turbine and the first fan to transmit rotation from the first turbine to the first fan. The second turbofan engine may include a second turbine, a second fan coupled to the second turbine to be driven by rotation of the second turbine, and a second transmission coupled between the second turbine and the second fan to transmit rotation from the second turbine to the second fan. The first turbine and the second turbine may be configured to rotate in a first direction. The first transmission may be configured to transmit rotation from the first turbine to the first fan to cause rotation of the first fan in the first direction. The second transmission may be configured to transmit rotation from the second turbine to the second fan to cause rotation of the second fan in a second direction opposite the first direction.

In some embodiments, the first transmission may be configured to provide a first speed ratio between the first turbine and the first fan, the second transmission may be configured to provide a second speed ratio between the second turbine and the second fan, and the magnitude of the first speed ratio may be equal to the magnitude of the second speed ratio. The first transmission may include a star gearset having a sun gear coupled to the first turbine for rotation therewith, a plurality of planet gears intermeshed with the sun gear and mounted to a carrier grounded to a case, and a ring gear intermeshed with the plurality of planet gears and coupled to the first fan for rotation therewith. Additionally, in some embodiments, the second transmission may include a planetary gearset having a sun gear coupled to the second turbine for rotation therewith, a plurality of planet gears intermeshed with the sun gear and mounted to a carrier coupled to the second fan for rotation therewith, and a ring gear intermeshed with the plurality of planet gears and grounded to a case. In some embodiments still, the first transmission may include a planetary gearset having a sun gear coupled to the first turbine for rotation therewith, a plurality of planet gears intermeshed with the sun gear and mounted to a carrier coupled to the first fan for rotation therewith, and a ring gear intermeshed with the plurality of planet gears and grounded to a case. The second transmission may include a star gearset having a sun gear coupled to the second turbine for rotation therewith, a plurality of planet gears intermeshed with the sun gear and mounted to a carrier grounded to the case, and a ring gear intermeshed with the plurality of planet gears and coupled to the second fan for rotation therewith. The sun gear of the first transmission may have a number of gear teeth, the ring gear of the first transmission may have a number of gear teeth, the sun gear of the second transmission may have a number of gear teeth, the ring gear of the second transmission may have a number of gear teeth, the number of gear teeth of the sun gears of the respective first and second transmissions may be different from one another, and the number of gear teeth of the ring gears of the respective first and second transmissions may be different from one another. In some embodiments yet still, the first fan may include a fan disk and a plurality of fan blades coupled to the fan disk to establish a first pitch angle, the second fan may include a fan disk and a plurality of fan blades coupled to the fan disk to establish a second pitch angle, and the second pitch angle may be about equal to and opposite the first pitch angle. The fan blades of the first fan may be movable relative to the fan disk of the first fan to change the first pitch angle, and the fan blades of the second fan may be movable relative to the fan disk of the second fan to change the second pitch angle.

According to yet another aspect of the present disclosure, a method of operating an aircraft may include operating a first turbofan engine of the aircraft to cause a first fan of the first turbofan engine to rotate in a first direction, operating a second turbofan engine of the aircraft to cause a second fan of the second turbofan engine to rotate in a second direction opposite the first direction, and adjusting a first pitch angle of a first plurality of fan blades of the first fan relative to a second pitch angle of a second plurality of fan blades of the second fan when operating the first and second turbofan engines.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
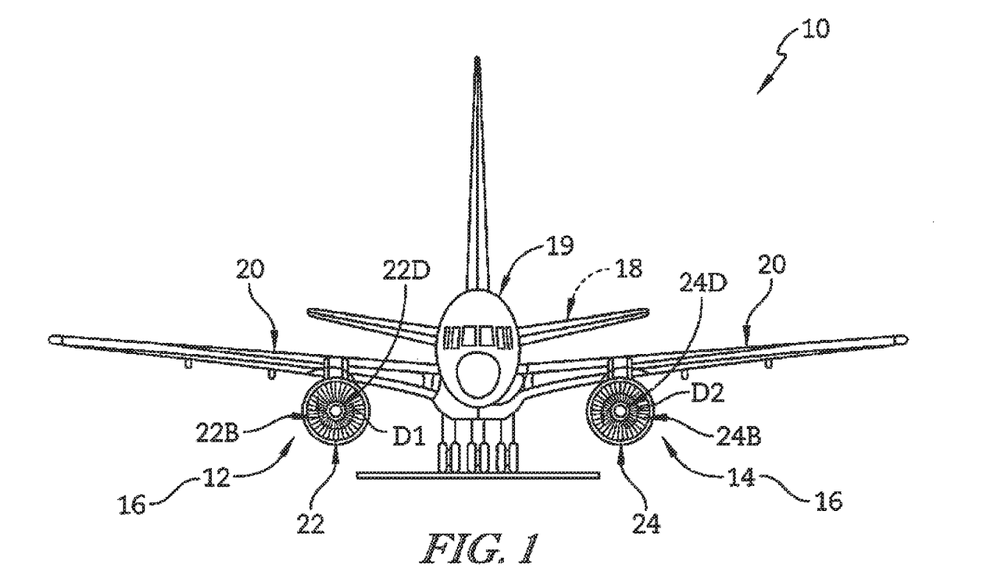
FIG. 1 is a front elevation view of an aircraft including two turbofan engines having fans configured to rotate in opposite directions.
Figure 2:
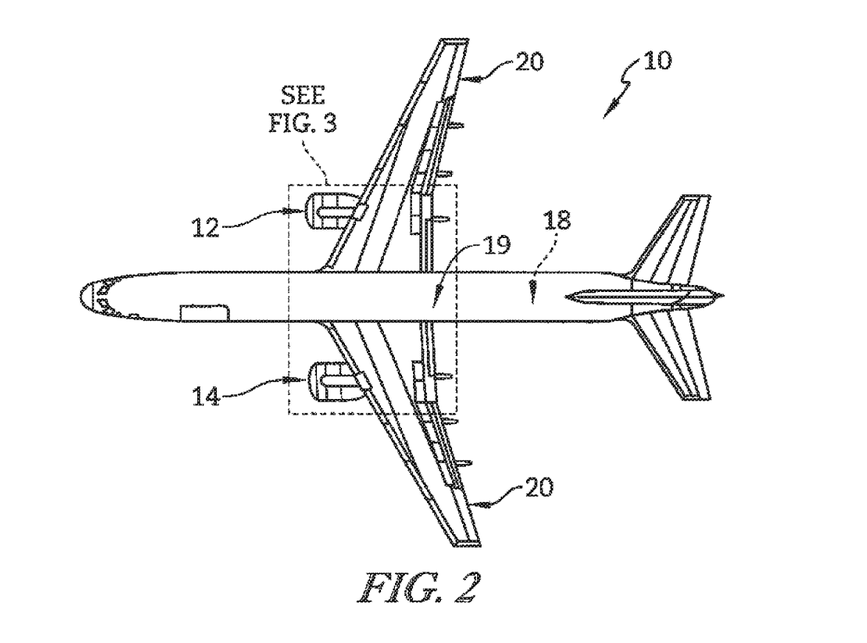
FIG. 2 is a plan view of the aircraft of FIG. 1 showing one turbofan engine coupled to each of a pair of wings of the aircraft extending outwardly from a frame of the aircraft opposite one another.

Referring now to FIGS. 1-2, an illustrative aircraft 10 is shown. The aircraft 10 illustratively includes a turbofan engine 12 and a turbofan engine 14, which constitute an engine set 16. The turbofan engines 12, 14 of the aircraft 10 have fans 22, 24 that rotate in opposing directions so that torques created by rotation of the fans 22, 24 react against one another and need not be reacted by other parts of the aircraft 10.

The aircraft 10 includes a frame 18 to which the turbofan engines 12, 14, a fuselage 19, and a pair of wings 20 are coupled as suggested in FIG. 1. The wings 20 extend outwardly from the frame 18 opposite one another as shown in FIGS. 1-2. The turbofan engine 12 is arranged under one of the pair of wings 20, and the turbofan engine 14 is arranged under the other of the pair of wings 20. The fuselage 19 is arranged between the turbofan engines 12, 14 as shown in FIG. 2.

A fan 22 of the turbofan engine 12 is configured to rotate in a direction D1, and a fan 24 of the turbofan engine 14 is configured to rotate in a direction D2 opposite the first direction D1 as shown in FIG. 1. In this way, torque applied to the frame 18 by the fan 22 of the turbofan engine 12 is counteracted by torque applied to the frame 18 by the fan 24 of the turbofan engine 14 during operation of the aircraft 10 so that the net torque applied to the frame 18 by the fans 22, 24 approaches zero. Accordingly, the frame 18 need not be designed to react torque from the turbofan engines 12, 14.

In the specific embodiment shown, the fan 22 of the turbofan engine 12 is configured to rotate in the clockwise direction D1 as shown in FIG. 1. Conversely, the fan 24 of the turbofan engine 14 is configured to rotate in the counterclockwise direction D2 as shown in FIG. 1. In other embodiments, the fan 22 may be configured to rotate in the counterclockwise direction D2, and the fan 24 may be configured to rotate in the clockwise direction D1.

The turbofan engines 12, 14 appear substantially similar to one another when viewed from the outside as shown in FIGS. 1 and 2. Components of the turbofan engines 12, 14 that are contained in cases also appear substantially similar to one another when viewed from the outside. As described in greater detail below, the turbofan engines 12, 14 differ from one another in the directions of rotation (i.e., D1 and D2) of the respective fans 22, 24, as well as in the transmissions 28, 38 included in the engines 12, 14.

Figure 3:
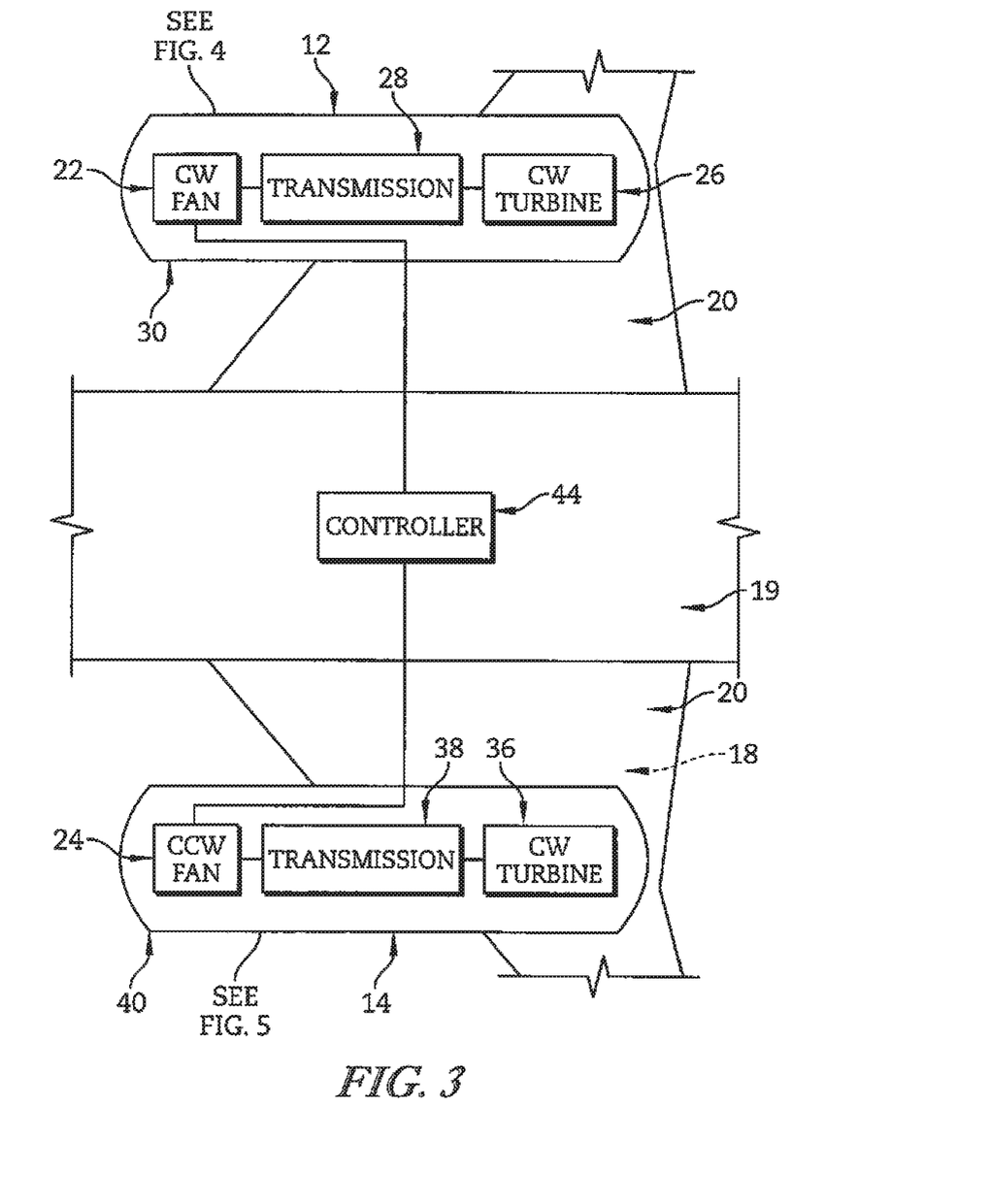
FIG. 3 is a diagrammatic view of the aircraft of FIG. 2 showing the components of each turbofan engine and a motion controller coupled to the fans of the turbofan engines.

Referring now to FIG. 3, the turbofan engine 12 includes the fan 22, a drive turbine 26, and a transmission 28, each of which is supported by a case 30. The fan 22 is coupled to the turbine 26 to be rotated by the turbine 26. The turbine 26 is driven by combustion products derived from compressed air and fuel. The transmission 28 is coupled between the turbine 26 and the fan 22 to transmit rotation from the turbine 26 to the fan 22.

The turbofan engine 14, similar to the engine 12, includes the fan 24, a drive turbine 36, and a transmission 38, each of which is supported by a case 40. The fan 24 is coupled to the turbine 36 to be rotated by the turbine 36. The turbine 36 is driven by combustion products derived from compressed air and fuel. The transmission 38 is coupled between the turbine 36 and the fan 24 to transmit rotation from the turbine 36 to the fan 24.

Figure 4:
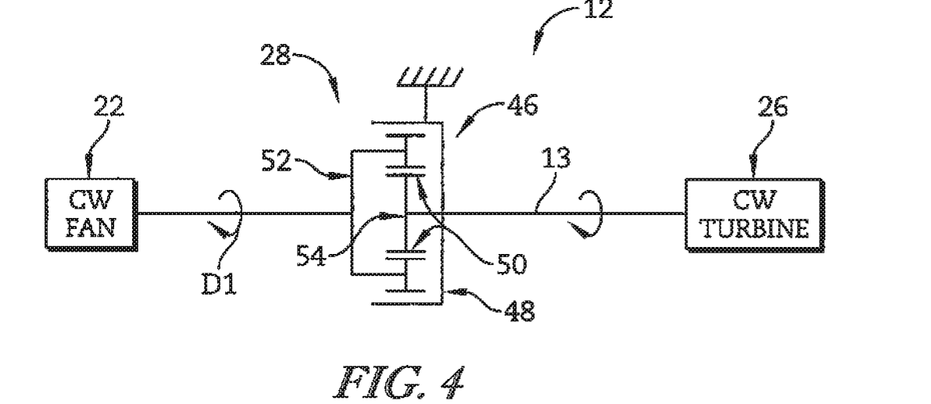
FIG. 4 is a diagrammatic view of one of the turbofan engines shown in FIG. 3 showing one transmission coupled between a turbine and the fan of the one turbofan engine.

The turbine 26 of the turbofan engine 12 is configured to rotate clockwise about an engine axis 13 of the engine 12 as shown in FIG. 4. The transmission 28 is configured to transmit rotation from the turbine 26 to the fan 22 to cause rotation of the fan 22 in the clockwise direction D1 about the axis 13 as shown in FIG. 4.

Figure 5:
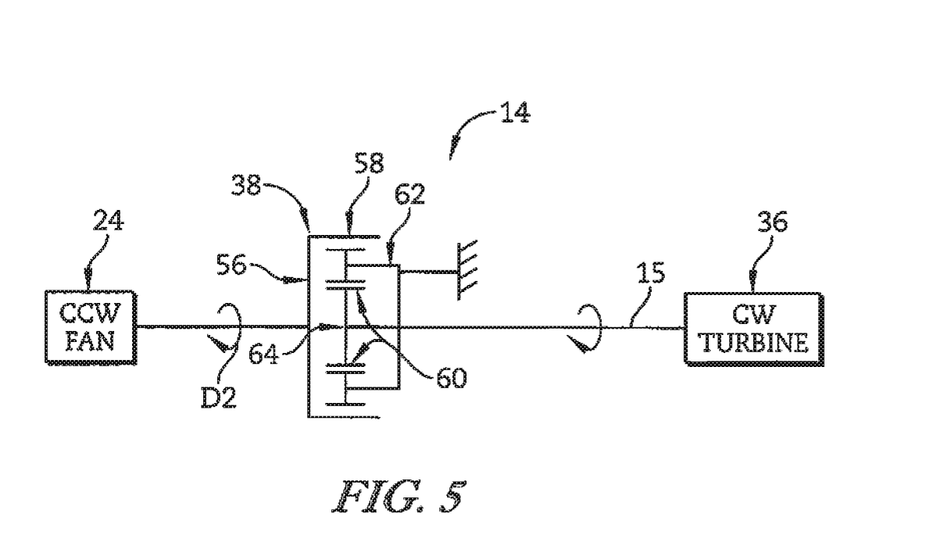
FIG. 5 is a diagrammatic view of the other of the turbofan engines shown in FIG. 3 showing another transmission coupled between a turbine and the fan of the other turbofan engine.

Similar to the turbine 26 of the engine 12, the turbine 36 of the turbofan engine 14 is configured to rotate clockwise about an engine axis 15 of the engine 14 as shown in FIG. 5. The transmission 38 is configured to transmit rotation from the turbine 36 to the fan 24 to cause rotation of the fan 24 in the counterclockwise direction D2 about the axis 15 as shown in FIG. 5. In other embodiments, the turbines 26, 36 may rotate in the counterclockwise direction so long as they are similar in their direction of rotation to allow for common components and design.

Torque is applied by each of the fans 22, 24 to the frame 18 as the fans 22, 24 rotate during operation of the aircraft 10. Because the fans 22, 24 rotate in opposite directions D1 and D2, respectively, torque applied to the frame 18 by the fan 22 is counteracted by torque applied to the frame 18 by the fan 24 during operation of the aircraft 10 so that the net torque applied to the frame 18 by the fans 22, 24 approaches zero.

Figure 6:
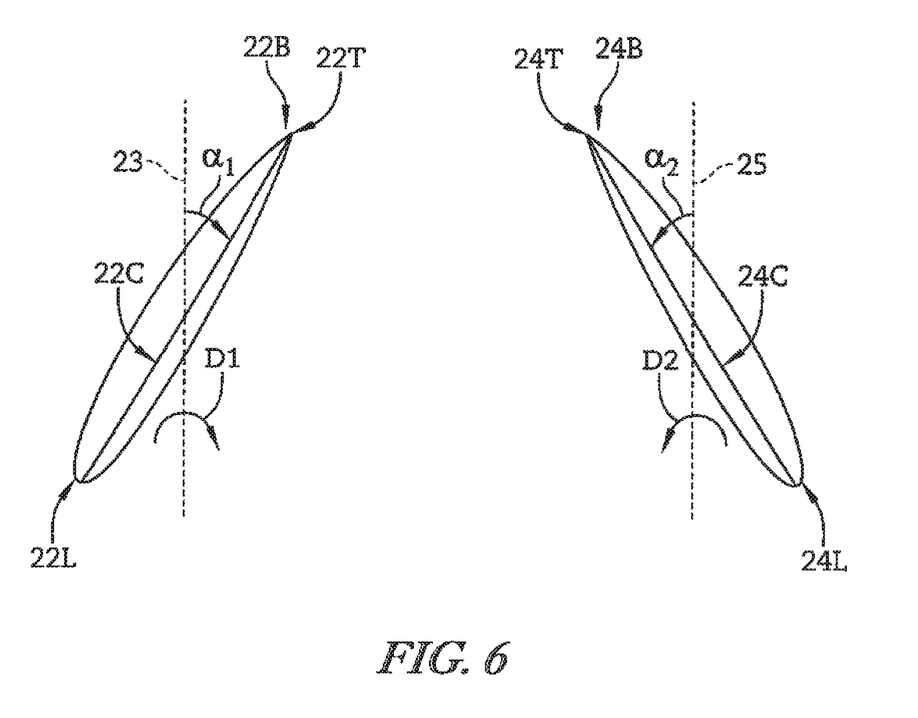
FIG. 6 is a diagrammatic view of pitch angles of fan blades included in the respective fans of the turbofan engines of FIG. 1.

The fan 22 includes a fan disk 22D and a plurality of fan blades 22B coupled to the fan disk 22D to establish a first pitch angle $\alpha_1$ as shown in FIG. 6. The fan blades 22B are movable relative to the fan disk 22D to change the first pitch angle $\alpha_1$ during operation of the aircraft 10. As such, the fan 22 is illustratively a variable-pitch fan. In other embodiments, however, the fan blades 22B may be immovably coupled to the fan disk 22D. In such embodiments, the fan 22 may be a fixed-pitch fan.

Each of the fan blades 22B has a chord length 22C that extends from a trailing edge 22T to a leading edge 22L of the fan blade 22B as shown in FIG. 6. The fan blades 22B are configured to rotate in the clockwise direction D1 about an axis 23. The first pitch angle $\alpha_1$ of each of the fan blades 22B is measured in the clockwise direction D1 from the axis 23 to the chord length 22C. The first pitch angle $\alpha_1$ describes the angle of each fan blade 22B between the axis 23 and the chord length 22C as the fan blade 22B extends in a radial direction away from the engine axis 13 from a blade root to a blade tip. Because each fan blade 22B may twist between the blade root and the blade tip, the first pitch angle $\alpha_1$ may describe the angle of each fan blade 22B between the axis 23 and the chord length 22C at any point between the blade root and the blade tip.

Similar to the fan 22, the fan 24 includes a fan disk 24D and a plurality of fan blades 24B coupled to the fan disk 24D to establish a second pitch angle $\alpha_2$ as shown in FIG. 6. The fan blades 24B are movable relative to the fan disk 24D to change the second pitch angle $\alpha_2$ during operation of the aircraft 10. As such, the fan 24 is illustratively a variable-pitch fan. In other embodiments, however, the fan blades 24B may be immovably coupled to the fan disk 24D. In such embodiments, the fan 24 may be a fixed-pitch fan.

Each of the fan blades 24B has a chord length 24C that extends from a trailing edge 24T to a leading edge 24L of the fan blade 24B as shown in FIG. 6. The fan blades 24B are configured to rotate in the counterclockwise direction D2 about an axis 25. The second pitch angle $\alpha_2$ of each of the fan blades 24B is measured in the counterclockwise direction D2 from the axis 25 to the chord length 24C. The second pitch angle $\alpha_2$ describes the angle of each fan blade 24B between the axis 25 and the chord length 24C as the fan blade 24B extends in a radial direction away from the engine axis 15 from a blade root to a blade tip. Because each fan blade 24B may twist between the blade root and the blade tip, the second pitch angle $\alpha_2$ may describe the angle of each fan blade 24B between the axis 25 and the chord length 24C at any point between the blade root and the blade tip.

To account for opposing rotation of the fans 22, 24, the first pitch angle $\alpha_1$ and the second pitch angle $\alpha_2$ may be about equal to and opposite one another as suggested by FIG. 6. The magnitude of the first and second pitch angles $\alpha_1$, $\alpha_2$ measured in respective directions D1, D2 about respective axes 23, 25 may be about equal to one another. Because the first and second pitch angles $\alpha_1$, $\alpha_2$ are measured in opposite directions D1, D2 about axes 23, 25, the first and second pitch angles $\alpha_1$, $\alpha_2$ may be about opposite one another (i.e., the first pitch angle $\alpha_1 \approx$ —the second pitch angle $\alpha_2$). In some embodiments, the first and second pitch angles $\alpha_1$, $\alpha_2$ may differ from one another by 90 degrees. In other embodiments, however, the first and second pitch angles $\alpha_1$, $\alpha_2$ may differ from one another by another suitable angle.

To control the respective first and second pitch angles $\alpha_1$, $\alpha_2$ of the fan blades 22B, 24B, the aircraft 10 further includes a motion controller 44 coupled to the fan blades 22B, 24B as shown in FIG. 3. The motion controller 44 is configured to control the first and second pitch angles $\alpha_1$, $\alpha_2$ relative to one another during operation of the aircraft 10. In one example, the motion controller 44 may be configured to maintain the first and second pitch angles $\alpha_1$, $\alpha_2$ about equal to and opposite one another during operation of the aircraft 10.

The motion controller 44 may include one actuation mechanism coupled to the fan blades 22B of the fan 22 and configured to control the first pitch angle $\alpha_1$ in response to a signal indicative of the monitored state of the first pitch angle $\alpha_1$. The motion controller 44 therefore may also include, or be coupled to, a sensor configured to monitor the first pitch angle $\alpha_1$ during operation of the aircraft 10.

The motion controller 44 may also include another actuation mechanism coupled to the fan blades 24B of the fan 24 and configured to control the second pitch angle $\alpha_2$ in response to a signal indicative of the monitored state of the second pitch angle $\alpha_2$. The motion controller 44 therefore may also include, or be coupled to, a sensor configured to monitor the second pitch angle $\alpha_2$ during operation of the aircraft 10.

In some embodiments, the motion controller 44 may be used to control yaw of the fuselage 19 during operation of the aircraft 10. Specifically, the motion controller 44 may be utilized in addition to a rudder and a vertical stabilizer of the aircraft 18 to control yaw of the fuselage 19 in operation of the aircraft 10. For example, the motion controller 44 may adjust the first pitch angle $\alpha_1$ and the second pitch angle $\alpha_2$ relative to one another to achieve a degree of yaw. In response to that adjustment, the rudder and the vertical stabilizer may act to maintain or alter the degree of yaw to a desired value. As such, the motion controller 44 may communicate with a separate mechanism used to control operation of the rudder and the vertical stabilizer.

In some embodiments, rather than each of the fans 22, 24 being a variable-pitch fan, one of the fans 22, 24 may be a fixed-pitch fan as indicated above. In such embodiments, the motion controller 44 may be configured to adjust the variable pitch angle of the variable-pitch fan (i.e., either fan 22 or 24) relative to the fixed pitch angle of the fixed-pitch fan (i.e., the other of fan 22 or 24) to maintain the variable pitch angle and the fixed pitch angle about equal to and opposite one another during operation of the aircraft 10.

Referring now to FIG. 4, the transmission 28 is shown coupled between an input (i.e., the turbine 26) and an output (i.e., the fan 22) along the engine axis 13 of the turbofan engine 12. The transmission 28 illustratively includes one simple epicyclic gearset 46. In other embodiments, the epicyclic gearset 46 may be a compound planetary gearset such as a meshed-planet planetary gearset or a stepped-planet planetary gearset. The transmission 28 is configured to transmit rotation from the turbine 26 to the fan 22 to cause rotation of the fan 22 in the clockwise direction D1 as shown in FIG. 4.

The epicyclic gearset 46 includes a ring gear 48, a plurality of planet gears 50, a carrier 52, and a sun gear 54 as shown in FIG. 4. Each of the planet gears 50 is intermeshed with the ring gear 48 and the sun gear 54, and each of the planet gears 50 is mounted to the carrier 52. The ring gear 48, the planet gears 50, and the sun gear 54 are illustratively straight-toothed gears. In other embodiments, the ring gear 48, the planet gears 50, and the sun gear 54 may be helical gears.

The gearset 46 is coupled between the turbine 26 and the fan 22 as shown in FIG. 4 to receive rotational power from the turbine 26 at a first speed and transmit the rotational power to the fan 22 at a second speed offset from the first speed. The transmission 28 is therefore configured to provide a first speed ratio between the turbine 26 and the fan 22 corresponding to the ratio of the first speed to the second speed.

In the illustrative arrangement, the sun gear 54 is coupled to the turbine 26 for common rotation therewith, and the carrier 52 is coupled to the fan 22 for common rotation therewith as shown in FIG. 4. The ring gear 48 is constrained against rotation about the engine axis 13. For instance, the ring gear 48 may be grounded to the case 30. The illustrative arrangement, therefore, is a "planetary" arrangement in which the planet gears 50 are permitted to rotate about axes parallel to the engine axis 13. As such, the epicyclic gearset 46 may be referred to herein as a planetary gearset.

Referring now to FIG. 5, the transmission 38 is shown coupled between an input (i.e., the turbine 36) and an output (i.e., the fan 24) along the engine axis 15 of the turbofan engine 14. The transmission 38 illustratively includes one simple epicyclic gearset 56. In other embodiments, the epicyclic gearset 56 may be a compound planetary gearset such as a meshed-planet planetary gearset or a stepped-planet planetary gearset. The transmission 38 is configured to transmit rotation from the turbine 36 to the fan 24 to cause rotation of the fan 24 in the counterclockwise direction D2 as shown in FIG. 5.

The epicyclic gearset 56 includes a ring gear 58, a plurality of planet gears 60, a carrier 62, and a sun gear 64 as shown in FIG. 5. Each of the planet gears 60 is intermeshed with the ring gear 58 and the sun gear 64, and each of the planet gears 60 is mounted to the carrier 62. The ring gear 58, the planet gears 60, and the sun gear 64 are illustratively straight-toothed gears. In other embodiments, the ring gear 58, the planet gears 60, and the sun gear 64 may be helical gears.

The gearset 56 is coupled between the turbine 36 and the fan 24 as shown in FIG. 5 to receive rotational power from the turbine 36 at a third speed and transmit the rotational power to the fan 24 at a fourth speed offset from the third speed. The transmission 38 is therefore configured to provide a second speed ratio between the turbine 36 and the fan 24 corresponding to the ratio of the third speed to the fourth speed.

In the illustrative arrangement, the sun gear 64 is coupled to the turbine 36 for common rotation therewith, and the ring gear 58 is coupled to the fan 24 for common rotation therewith as shown in FIG. 5. The carrier 62 is constrained against rotation about the engine axis 15. For instance, the carrier 62 may be grounded to the case 40. The illustrative arrangement, therefore, is a "star" arrangement in which the planet gears 60 do not rotate about axes parallel to the engine axis 15. As such, the epicyclic gearset 56 may be referred to herein as a star gearset.

In other embodiments, the transmission 28 may include the star gearset 56, and the transmission 38 may include the planetary gearset 46. In such embodiments, the transmission 28 may be configured to transmit rotation from the turbine 26 to the fan 22 in the counterclockwise direction D2, and the transmission 38 may be configured to transmit rotation from the turbine 36 to the fan 24 in the clockwise direction D1.

The magnitude of the first speed ratio provided by the transmission 28 between the turbine 26 and the fan 22 is illustratively equal to the magnitude of the second speed ratio provided by the transmission 38 between the turbine 36 and the fan 24. As suggested above, the cases in which each of the transmissions 28, 38 is contained appear similar to one another when viewed from the outside.

The sun gear 54 and the ring gear 48 of the transmission 28 illustratively differ from the sun gear 64 and the ring gear 58 of the transmission 38. The sun gear 54 has a number of gear teeth, and the ring gear 48 has a number of gear teeth. The sun gear 64 also has a number of gear teeth, and the ring gear 58 also has a number of gear teeth. The number of gear teeth of the sun gears 54, 64 of the respective transmissions 28, 38 are illustratively different from one another. Similarly, the number of gear teeth of the ring gears 48, 58 of the respective transmissions 28, 38 are illustratively different from one another.

Referring now to FIGS. 1-5, a method of operating the aircraft 10 may include (i) operating the turbofan engine 12 to cause the fan 22 to rotate in the clockwise direction D1, (ii) operating the turbofan engine 14 to cause the fan 24 to rotate in the counterclockwise direction D2, and (iii) adjusting the first pitch angle $\alpha_1$ of the plurality of blades 22B of the fan 22 relative to the second pitch angle $\alpha_2$ of the plurality of blades 24B of the fan 24 when operating the engines 12, 14. Adjusting the first pitch angle $\alpha_1$ relative to the second pitch angle $\alpha_2$ may include adjusting the first pitch angle $\alpha_1$ relative to the second pitch angle $\alpha_2$ so that the first and second pitch angles $\alpha_1$, $\alpha_2$ are about equal to and opposite one another.

The invention is for the aircraft 10 having two turbine fan engines 12, 14, called turbofan engines, where the fans 22, 24 of the engines 12, 14 can rotate either clockwise or counterclockwise (i.e., in directions D1 and D2). The engine 12 having the fan 22 configured for clockwise rotation may be highly common with the engine 14 having the fan 24 configured for counterclockwise rotation.

The fans 22, 24 may contain fan blades 22B, 24B and other structures suitable for the direction of rotation of each of the fans 22, 24. The engines 12, 14 may contain an appropriate gear train such as transmissions 28, 38 to provide for the differing directions of rotation of the fans 22, 24. The controls of the aircraft 10 such as the motion controller 44 may accommodate the opposing directions of rotation of the fans 22, 24 of the engines 12, 14. The remaining components of the engines 12, 14 (e.g., the turbines 26, 36) may be common between the engines 12, 14.

The aircraft 10 in which the engines 12, 14 are included is not required to accommodate the additive torque reactions from fans configured for common rotation, which is typically the current operating condition for multi-engine aircraft. The engines 12, 14 having fans 22, 24 configured to rotate in opposite directions may provide subtractive torque reactions to the aircraft 10, thereby permitting a more aerodynamic configuration of the aircraft.

In one embodiment, the engine 12 having the fan 22 configured for clockwise rotation in direction D1 may have the planetary gearset 46 arrangement in which the direction of rotation of the fan 22 is common to that of the turbine 26. The engine 14 having the fan 24 configured for counter-clockwise rotation in direction D2 may have the star gearset 56 arrangement in which the direction of rotation of the fan 24 is common to that of the turbine 36.

In some embodiments, the aircraft 10 may include a motion controller 44 that may adjust the first pitch angle $\alpha_1$ relative to the second pitch angle $\alpha_2$ to vary the pitch angles $\alpha_1$, $\alpha_2$ relative to one another. The adjustment of the pitch angles $\alpha_1$, $\alpha_2$ may be based on the measured rotational speed of the fans 22, 24 and/or the measured thrust produced by the fans 22, 24. In embodiments in which the fans 22, 24 are fixed-pitch fans, the pitch angles $\alpha_1$, $\alpha_2$ may be equal to and opposite one another. In such embodiments, some predetermined variation in rotational speed of the fans 22, 24 and/or thrust produced by the fans 22, 24 during operation of the engines 12, 14 may be acceptable. In embodiments in which the fans 22, 24 are variable-pitch fans, adjustment of the pitch angles $\alpha_1$, $\alpha_2$ may be performed according to the particular operating point of the aircraft 10.

The fan blades 22B and 24B may have a twist that varies the respective pitch angles $\alpha_1$, $\alpha_2$ from the root of the blades 22B, 24B to the tip of the blades 22B, 24B. Each of the pitch angles $\alpha_1$, $\alpha_2$ may therefore be defined at a given radius and may be used as a point of reference for constructing the fans 22, 24. In embodiments in which the fans 22, 24 are variable-pitch fans, the optimal pitch angles $\alpha_1$, $\alpha_2$ may vary depending on the speed of the aircraft 10. In one example, the pitch angles $\alpha_1$, $\alpha_2$ may differ from one another by about 90 degrees.

During operation of the aircraft 10, the torques produced by the fans 22, 24 may oppose one another and thus subtract from one another so that the net torque produced by the fans 22, 24 approaches zero. Because torsional loads experienced by the aircraft 10 may be decreased compared to an arrangement in which the torques produced by the fans 22, 24 do not oppose one another, the aircraft 10 may experience less drag and better performance as a result.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An aircraft comprising
   a frame,
   a first turbofan engine coupled to the frame, the first turbofan engine including a first turbine, a first fan coupled to the first turbine to be driven by rotation of the first turbine, and a first transmission coupled between the first turbine and the first fan to transmit rotation from the first turbine to the first fan, the first transmission having a star gearset, and
   a second turbofan engine coupled to the frame, the second turbofan engine including a second turbine, a second fan coupled to the second turbine to be driven by rotation of the second turbine, and a second transmission coupled between the second turbine and the second fan to transmit rotation from the second turbine to the second fan, the second transmission having a planetary gearset,
   wherein the first turbine and the second turbine are configured to rotate in a first direction, the first transmission is configured to transmit rotation from the first turbine to the first fan to cause rotation of the first fan in the first direction, and the second transmission is configured to transmit rotation from the second turbine to the second fan to cause rotation of the second fan in a second direction opposite the first direction.

2. The aircraft of claim 1, wherein the star gearset includes a sun gear coupled to the first turbine for rotation therewith, a plurality of planet gears intermeshed with the sun gear and mounted to a carrier grounded to a case, and a ring gear intermeshed with the plurality of planet gears and coupled to the first fan for rotation therewith.

3. The aircraft of claim 1, wherein the planetary gearset includes a sun gear coupled to the second turbine for rotation therewith, a plurality of planet gears intermeshed with the sun gear and mounted to a carrier coupled to the second fan for rotation therewith, and a ring gear intermeshed with the plurality of planet gears and grounded to a case.

4. The aircraft of claim 3, wherein the star gearset includes a sun gear coupled to the first turbine for rotation therewith, a plurality of planet gears intermeshed with the sun gear and mounted to a carrier grounded to a case, and a ring gear intermeshed with the plurality of planet gears and coupled to the first fan for rotation therewith.

5. The aircraft of claim 4, wherein the first transmission is configured to provide a first speed ratio between the first turbine and the first fan, the second transmission is configured to provide a second speed ratio between the second turbine and the second fan, and a magnitude of the first speed ratio is equal to a magnitude of the second speed ratio.

6. The aircraft of claim 1, wherein the first fan includes a fan disk and a plurality of fan blades coupled to the fan disk to establish a first pitch angle, the second fan includes a fan disk and a plurality of fan blades coupled to the fan disk to establish a second pitch angle, and the second pitch angle is about equal to and opposite the first pitch angle.

7. The aircraft of claim 6, wherein the fan blades of the first fan are movable relative to the fan disk of the first fan to change the first pitch angle and the fan blades of the second fan are movable relative to the fan disk of the second fan to change the second pitch angle.

8. The aircraft of claim 6, wherein the fan blades of the first fan are immovably coupled to the fan disk of the first fan and the fan blades of the second fan are immovably coupled to the fan disk of the second fan.

9. The aircraft of claim 1, further comprising a fuselage arranged between the first turbofan engine and the second turbofan engine.

10. An engine set for an aircraft, the engine set comprising a first turbofan engine including a first turbine, a first fan coupled to the first turbine to be driven by rotation of the first turbine, and a first transmission coupled between the first turbine and the first fan to transmit rotation from the first turbine to the first fan, the first transmission including a planetary gearset having a sun gear coupled to the first turbine for rotation therewith, a plurality of planet gears intermeshed with the sun gear and mounted to a carrier coupled to the first fan for rotation therewith, and a ring gear intermeshed with the plurality of planet gears and grounded to a case, and a second turbofan engine including a second turbine, a second fan coupled to the second turbine to be driven by rotation of the second turbine, and a second transmission coupled between the second turbine and the second fan to transmit rotation from the second turbine to the second fan, the second transmission including a star gearset having a sun gear coupled to the second turbine for rotation therewith, a plurality of planet gears intermeshed with the sun gear and mounted to a carrier grounded to the case, and a ring gear intermeshed with the plurality of planet gears and coupled to the second fan for rotation therewith, wherein the first turbine and the second turbine are configured to rotate in a first direction, the first transmission is configured to transmit rotation from the first turbine to the first fan to cause rotation of the first fan in the first direction, and the second transmission is configured to transmit rotation from the second turbine to the second fan to cause rotation of the second fan in a second direction opposite the first direction.

11. The engine set of claim 10, wherein the first transmission is configured to provide a first speed ratio between the first turbine and the first fan, the second transmission is configured to provide a second speed ratio between the second turbine and the second fan, and a magnitude of the first speed ratio is equal to a magnitude of the second speed ratio.

12. The engine set of claim 11, wherein (i) the sun gear of the first transmission has a number of gear teeth, (ii) the ring gear of the first transmission has a number of gear teeth, (iii) the sun gear of the second transmission has a number of gear teeth, (iv) the ring gear of the second transmission has a number of gear teeth, (v) the number of gear teeth of the sun gears of the respective first and second transmissions are different from one another, and (vi) the number of gear teeth of the ring gears of the respective first and second transmissions are different from one another.

13. The engine set of claim 11, wherein the first fan includes a fan disk and a plurality of fan blades coupled to the fan disk to establish a first pitch angle, the second fan includes a fan disk and a plurality of fan blades coupled to the fan disk to establish a second pitch angle, and the second pitch angle is about equal to and opposite the first pitch angle.

14. A method of operating an aircraft, the method comprising operating a first turbofan engine of the aircraft to cause a first transmission of the first turbofan engine including a star gearset to transmit rotation from a first turbine of the first turbofan engine to a first fan of the first turbofan engine to cause the first fan to rotate in a first direction, operating a second turbofan engine of the aircraft to cause a second transmission of the second turbofan engine including a planetary gearset to transmit rotation from a second turbine of the second turbofan engine to a second fan of the second turbofan engine to cause the second fan to rotate in a second direction opposite the first direction, and adjusting a first pitch angle of a first plurality of fan blades of the first fan relative to a second pitch angle of a second plurality of fan blades of the second fan when operating the first and second turbofan engines.

* * * * *